(12) United States Patent
Kim (10) Patent No.: US 12,111,039 B2
(45) Date of Patent: Oct. 8, 2024

(54) PREFAB LIGHTING DEVICE

(71) Applicant: HYUNDAI MOBIS CO., LTD., Seoul (KR)

(72) Inventor: Won Sik Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/081,089

(22) Filed: Dec. 14, 2022

(65) Prior Publication Data

US 2023/0400172 A1   Dec. 14, 2023

(30) Foreign Application Priority Data

Jun. 8, 2022   (KR) .................. 10-2022-0069398

(51) Int. Cl.
| | |
|---|---|
| *F21V 19/04* | (2006.01) |
| *B60Q 3/60* | (2017.01) |
| *B60Q 3/74* | (2017.01) |
| *B60Q 3/80* | (2017.01) |
| *F21S 2/00* | (2016.01) |
| *F21V 19/00* | (2006.01) |
| *F21V 23/06* | (2006.01) |

(52) U.S. Cl.
CPC ............ *F21V 19/04* (2013.01); *B60Q 3/60* (2017.02); *B60Q 3/74* (2017.02); *B60Q 3/80* (2017.02); *F21S 2/005* (2013.01); *F21V 19/0045* (2013.01); *F21V 23/06* (2013.01)

(58) Field of Classification Search
CPC ...... F21V 19/04; F21V 19/0045; F21V 23/06; F21S 2/005; F21K 9/272; B60Q 3/60; B60Q 3/74; B60Q 3/80; B60Q 3/53; B60Q 3/78; F21Y 2115/10; F21Y 2113/13
See application file for complete search history.

(56) References Cited

U.S. PATENT DOCUMENTS

| | | | |
|---|---|---|---|
| 7,832,897 B2 * | 11/2010 | Ku | F21S 2/005 362/249.02 |
| 8,210,715 B2 * | 7/2012 | Mostoller | H01R 33/09 362/249.02 |
| 2021/0148559 A1 * | 5/2021 | Huang | G02B 6/0043 |

* cited by examiner

*Primary Examiner* — Peggy A Neils
(74) *Attorney, Agent, or Firm* — MORGAN, LEWIS & BOCKIUS LLP

(57) ABSTRACT

A prefab lighting device according to an embodiment of the present invention, which is installed in an interior of a vehicle and implements indoor lighting, includes a light-emitting diode (LED) block provided with an LED installed thereon and a connector formed on each of one side surface and the other side surface thereof and electrically connected to the LED, a lighting controller detachably connected to the LED block through the connector to control operation of the LED block, and an input unit connected to the lighting controller to input settings for the operation of the LED block, wherein the LED block is provided as a plurality of LED blocks detachably connected to each other through the connectors.

15 Claims, 10 Drawing Sheets

PREFAB LIGHTING DEVICE

CROSS-REFERENCE TO RELATED APPLICATION

This application claims priority to and the benefit of Korean Patent Application No. 10-2022-0069398, filed on Jun. 8, 2022, the disclosure of which is incorporated herein by reference in its entirety.

BACKGROUND

1. Field of the Invention

The present invention relates to a prefab lighting device, and more specifically, to a prefab lighting device installed in a vehicle.

2. Discussion of Related Art

Vehicles are provided with various types of lamps which can emit light forward from the vehicles or illuminate interiors of the vehicles, and recently, there are cases in which mood lamps are provided to satisfy sensibility of users.

A mood lamp is an indoor lamp provided in an interior of a vehicle to satisfy sensitivity of a user through various lighting effects, and may be formed by arranging small-sized lamps, such as light-emitting diodes (LEDs), in various shapes on a wide panel or substrate. In addition, in order to provide a customized atmosphere to a user, the mood lamp is formed so that a color and brightness can be selected and adjusted according to the user's requirements to form a further improved environment in the vehicle.

In the case of conventional mood lamps in mass production, long strap type lighting is implemented by coupling a single light source to a light guide part provided as a component having a long rod shape, such as, a light guide.

However, recently, various development requirements for implementing dynamic effects other than a simple mood lighting type are increasing, and there are difficulties that a printed circuit board (PCB) design should be newly performed whenever a mockup is manufactured to verify a product in order to satisfy the requirements, and when the number of LEDs, which are light sources, or a specification is changed, an overall design should be performed again. Accordingly, there are problems that a long time and cost loss occur during a process of verifying an initial concept.

SUMMARY OF THE INVENTION

The present invention is directed to providing a prefab lighting device in which an efficiency of product unit verification for a lighting concept designed by an initial developer is improved and a degree of installation freedom is improved by allowing modifications corresponding to any structure at an installation position in a vehicle.

The objectives of the present invention are not limited to the above-described objectives, and other objectives which are not mentioned above will be clearly understood by those skilled in the art through the following description.

According to an aspect of the present invention, there is provided a prefab lighting device, which is installed in an interior of a vehicle and implements indoor lighting, the prefab lighting device including a light-emitting diode (LED) block provided with an LED installed thereon and a connector formed on each of one side surface and the other side surface thereof and electrically connected to the LED, a lighting controller detachably connected to the LED block through the connector to control operation of the LED block, and an input unit connected to the lighting controller to input settings for the operation of the LED block, wherein the LED block is provided as a plurality of LED blocks detachably connected to each other through the connectors.

The LED block may include a base including a circuit pattern.

The LED is mounted on an upper surface of the base and connected to the circuit pattern, and the connectors may include a male connector provided on one side surface of the base and a female connector provided in the other side surface of the base and are connected to the LED through the circuit pattern.

The male connector may include guide protrusions protruding outward from two side surfaces, the female connector may include guide grooves for accommodating the guide protrusions in two side surfaces, and the guide grooves may be extended and formed to be long in a fastening direction of the guide grooves and the male connector.

The guide grooves may include hook protrusions that are formed on an end portion to prevent separation of the guide protrusions.

The male connector may include a body protruding outward from the one side surface of the base and wings protruding outward from lower ends of two side surfaces of the body to form a step structure with an upper surface of the body, and the female connector may include a first groove recessed inward from the other side surface of the base to accommodate a body of another male connector and second grooves formed at two sides of a lower portion of the first groove to accommodate wings of the another male connector.

A plurality of connecting protrusions by which the circuit pattern is exposed may be formed on a lower surface of the body, and a plurality of connecting grooves by which the circuit pattern is exposed may be formed to be recessed in a bottom surface of the first groove in correspondence to the connecting protrusions.

The male connector may include a horizontal member extending parallel to and outward from one side surface of the base and a vertical member extending downward from an end portion of the horizontal member toward a lower surface of the base, and the female connector may include a housing member including an accommodation groove which extends parallel to and outward from the other side surface of the base, is open upward, and accommodates the vertical member of another male connector.

The vertical member may have a structure having a cylindrical shape and include a plurality of connecting protrusions which protrude from a lower surface so that the circuit pattern is exposed, and the accommodation groove provided in an end portion of the housing member may have a shape corresponding to a shape of the vertical member and include a plurality of connecting grooves which are formed to be recessed in a bottom surface so that the circuit pattern is exposed to correspond to the connecting protrusions.

The connecting protrusions may be arranged to be spaced a predetermined distance from a center toward an outer edge of the lower surface, and the connecting grooves may be arranged to be spaced apart from each other to form partial circular orbits on concentric circles about a center of the accommodation groove.

The vertical member may include a protrusion on an outer circumferential surface, the housing member may include a flange protruding from an upper portion of the accommodation groove toward an inner side of the accommodation groove, and in a state in which the vertical member is accommodated in the accommodation groove, upward movement of the protrusion may be blocked by the flange.

The lighting controller may include a frame including the circuit pattern and a micro controller unit (MCU) mounted on the frame and connected to the circuit pattern, and at least one of the male connector and the female connector may be provided on one side surface of the frame and connected to the MCU through the circuit pattern.

The LED may be further mounted on an upper surface of the frame, and the LED may be connected to the MCU through the circuit pattern.

The input unit may include a touch type display.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention. Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination among a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, embodiments will be described in detail with reference to the accompanying drawings, components that are the same or correspond to each other will be denoted by the same or corresponding reference numerals regardless of symbols of the accompanying drawings, and redundant descriptions will be omitted.

Figure 1:
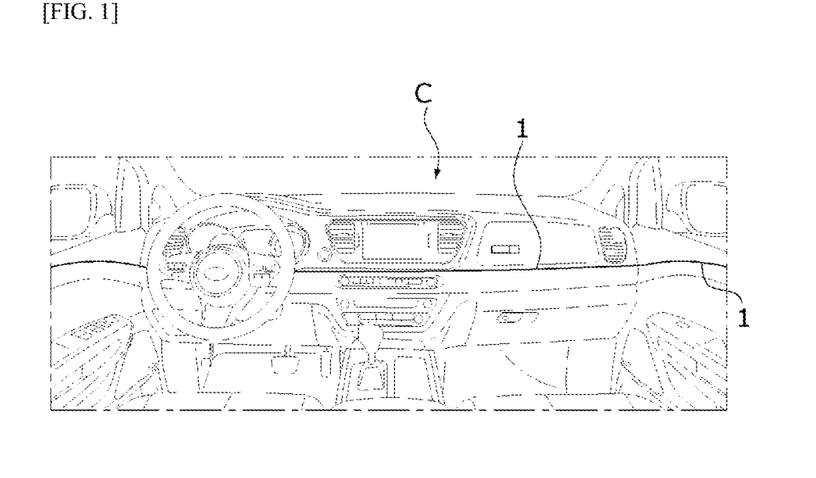
FIG. 1 is a schematic view illustrating a state in which a lighting device is installed in an interior of a vehicle according to an embodiment of the present invention.
Figure 2:
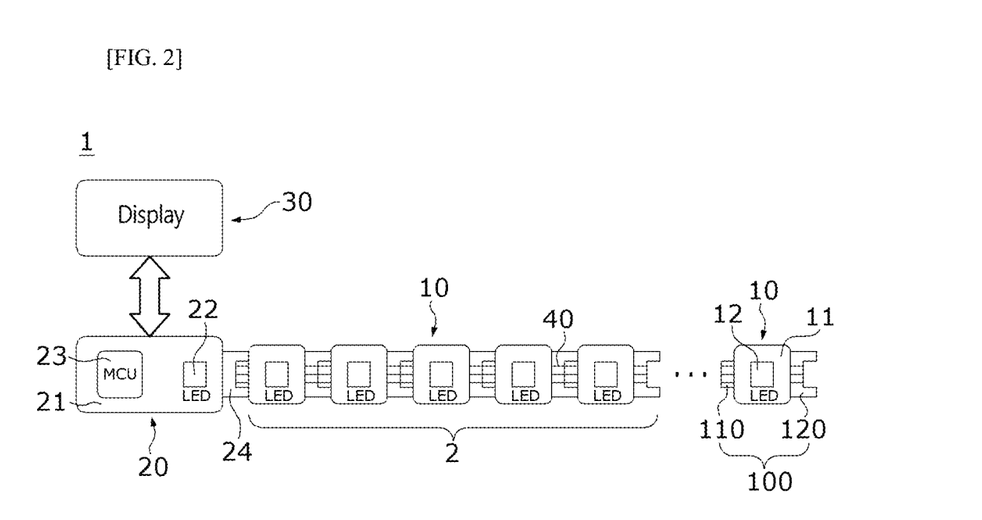
FIG. 2 is a schematic block diagram illustrating the lighting device according to the embodiment of the present invention.

FIG. 1 is a schematic view illustrating a state in which a lighting device is installed in an interior of a vehicle according to an embodiment of the present invention, and FIG. 2 is a schematic block diagram illustrating the lighting device according to the embodiment of the present invention.

A lighting device 1 according to the embodiment of the present invention may be formed to be installed in an interior of a vehicle C so as to implement indoor lighting. In the embodiment, the lighting device 1 may implement any indoor mood lighting for a dynamic effect and the like.

Referring to the drawings, the lighting device 1 according to the embodiment of the present invention may include light-emitting diode (LED) blocks 10, a lighting controller 20, and an input unit 30.

The plurality of LED blocks 10 may be detachably connected to each other through connectors 100. The plurality of the LED blocks 10 may be connected in series and installed in the interior of the vehicle, and the number of the LED blocks 10 may be variously changed according to an installation position and a light design to be implemented.

The lighting controller 20 may be detachably connected to the LED blocks 10 through a connector 24 and may control operation of the LED blocks 10.

The input unit 30 may be connected to the lighting controller 20 to input settings for the operation of the LED blocks 10. In the embodiment, the input unit 30 may include a touch type display, and a passenger of the vehicle may set an operation mode (turning on or off, dynamic, and the like), a lighting color, a lighting brightness, the number of operating LED blocks 10, and the like of the LED blocks 10 through the input unit 30.

Such setting information may be transmitted to the lighting controller 20, and the lighting controller 20 may control the operation of the LED blocks 10 to implement various mood lighting on the basis of the input information.

Hereinafter, the LED blocks 10 and the lighting controller 20 will be more specifically described.

LEDs 12 may be installed on upper surfaces of the LED blocks 10. In addition, the connectors 100 electrically connected to the LEDs 12 may be provided on one side surface and the other side surface of each of the LED blocks 10.

Specifically, the LED block 10 may include a base 11 on which a circuit pattern 40 is provided, and the LEDs 12 may be mounted on upper surfaces of the base 11 and connected to the circuit pattern 40. In addition, the connector 100 may include a male connector 110 provided on one side surface of the base 11 and a female connector 120 provided on the other side surface of the base 11 and may be connected to the LEDs 12 through the circuit pattern 40.

In a state in which the plurality of LED blocks 10 are connected to each other through the male connectors 110 and the female connectors 120, the plurality of LED blocks 10 may be arranged in series to complete an LED block assembly 2. In addition, straight line type lighting may be implemented as much as the number of the LED blocks 10 connected to each other. Particularly, since the number of LED blocks 10 can be freely changed and installed according to an installation structure of the interior of the vehicle C, there is an advantage of improving a degree of installation freedom.

Each of the circuit patterns 40 may include a pair of power lines and a pair of communication lines. However, in the present embodiment, a structure of the circuit pattern 40 is not limited thereto.

In the embodiment, the LED 12 used as a light source may include an intelligent smart embedded LED (ISELED). In addition, a lens (not shown) which diffuses light generated by the LED 12 may be mounted on the LED 12.

Each of the bases 11 may be a printed circuit board (PCB) or LMA board, and, in the present embodiment, it is illustrated that the base 11 is formed in a quadrangular shape, but the base 11 is not limited thereto.

The lighting controller 20 may include a frame 21 including a circuit pattern (not shown) and a micro controller unit (MCU) 23 mounted on the frame 21 and connected to the circuit pattern. In addition, the connector 24 may be provided on one side surface of the frame 21 and connected to the MCU 23 through the circuit pattern. The connector 24 may have a shape corresponding to one of the male connectors 110 and the female connectors 120 of the LED blocks 10 and connected to one of the male connectors 110 and the female connectors 120 of the LED blocks 10.

In addition, an LED 22 may be further mounted on an upper surface of the frame 21. The LED 22 may be the same as the LED 12 of the LED block 10 and may be connected to the MCU 23 through the circuit pattern.

In the embodiment, the frame 21 may be a PCB or an LMA board.

Figure 3A:
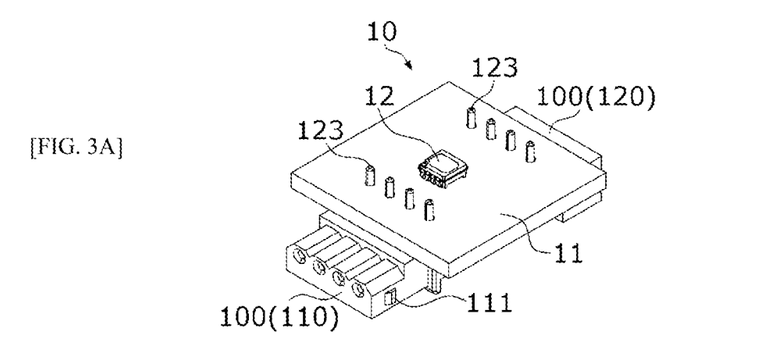
FIGS. 3A and 3B are schematic perspective views illustrating a light-emitting diode (LED) block according to one embodiment in the lighting device of FIG. 2.
Figure 3B:
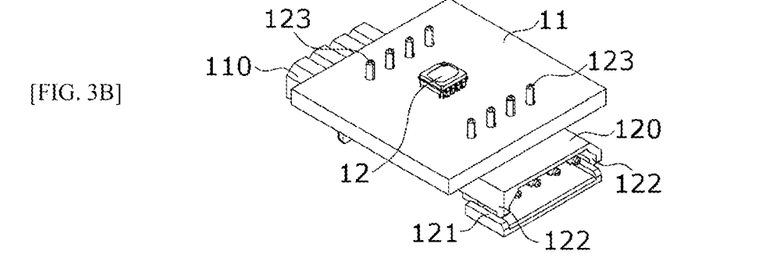
Figure 4:
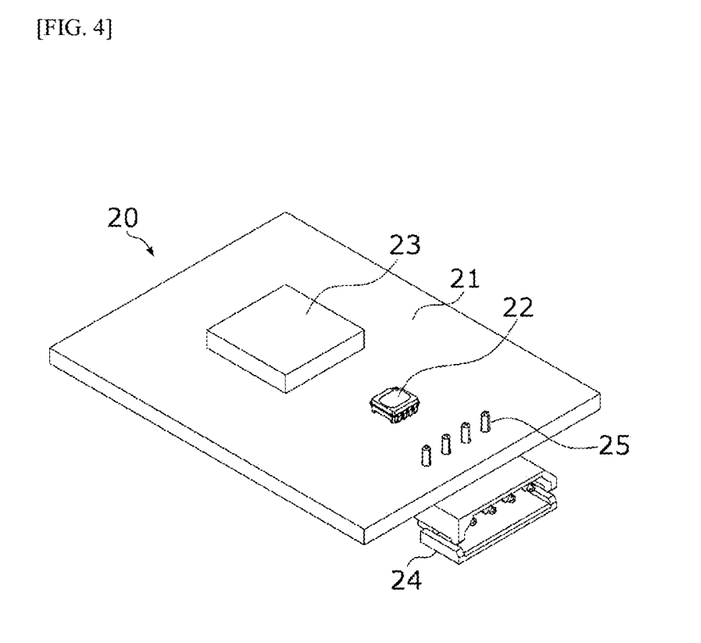
FIG. 4 is a schematic perspective view illustrating a lighting controller according to one embodiment in the lighting device of FIG. 2.

FIGS. 3 and 4 schematically show an LED block 10 and a lighting controller according to one embodiment.

Referring to the drawings, the LED block 10 may be formed as a structure in which connectors 100 and a base 11 are provided as individual parts, and the connectors 100 are mounted on the base 11. In this case, the base 11 may be provided as a PCB.

In the embodiment, a male connector 110 may be connected to one lower side of the base 11 to extend forward from one side surface, and a female connector 120 may be connected to the other lower side of the base 11 to extend forward from the other side surface. That is, the male connector 110 and the female connector 120 may be mounted on the base 11 to extend in opposite directions.

The male connector 110 and the female connector 120 may be connected to a circuit pattern (not shown) provided on the base 11 through connection terminals 123 which pass through the base 11 and are connected to the male connector 110 and the female connector 120.

The male connector 110 and the female connector 120 may be formed to be mechanically and electrically connected such that the male connector 110 and the female connector 120 have shapes corresponding to each other so that the male connector 110 is inserted into and fastened to the female connector 120.

The male connector 110 may include guide protrusions 111 formed on two side surfaces to protrude outward. In addition, the female connector 120 corresponding to the male connector 110 may include guide grooves 121 formed in two side surfaces to accommodate the guide protrusions 111. Each of the guide grooves 121 may have a slit type structure in which the side surface of the female connector 120 is vertically cut and may be extended and formed to be long in a direction in which the female connector 120 is fastened to the male connector 110.

The guide groove 121 may include a hook protrusion 122 formed on an end portion to prevent separation of one of the guide protrusions 111 in order to prevent the male connector 110 from being separated due to an external impact or the like after the male connector 110 is fastened to the female connector 120.

An LED block assembly 2 formed by connecting a plurality of LED blocks 10 such that the female connector 120 of the LED block 10 is fastened to the male connector 110 of another LED block 10 can be easily formed (see FIG. 2), and thus strap type lighting can be easily implemented. Particularly, by simply assembling and connecting the LED blocks 10, the number of LEDs for implementing dynamic lighting can be freely adjusted.

Like the LED block 10, the lighting controller 20 may be formed as a structure in which a connector 24 and a frame 21 are provided as individual parts and the connector 24 is mounted on the frame 21. In this case, the frame 21 may be provided as a PCB.

In the present embodiment, it is illustrated that a female connector is mounted on and connected to a lower surface of the frame 21, but the present invention is not limited thereto. For example, a male connector may also be mounted on the frame 21.

The connector 24 may be connected to a circuit pattern (not shown) provided on the frame 21 through connection terminals 25 which pass through the frame 21 and are connected to the connector 24.

Figure 5A:
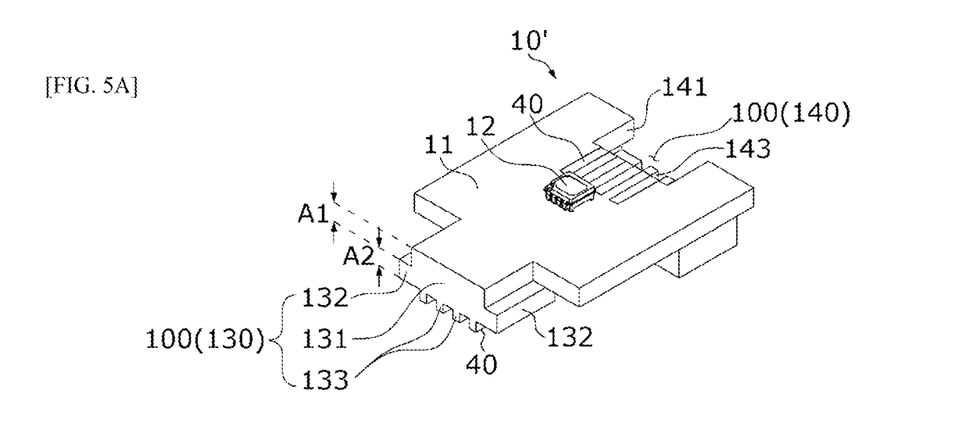
FIGS. 5A and 5B are schematic perspective views illustrating an LED block according to another embodiment.
Figure 5B:
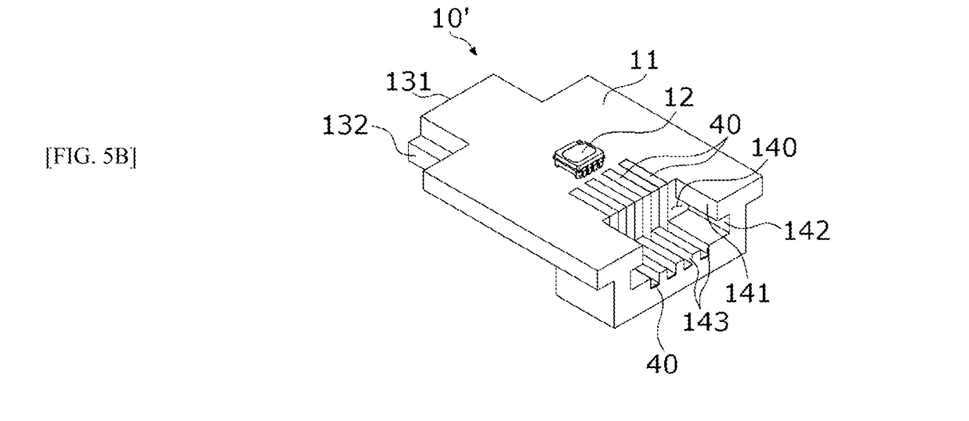
Figure 6:
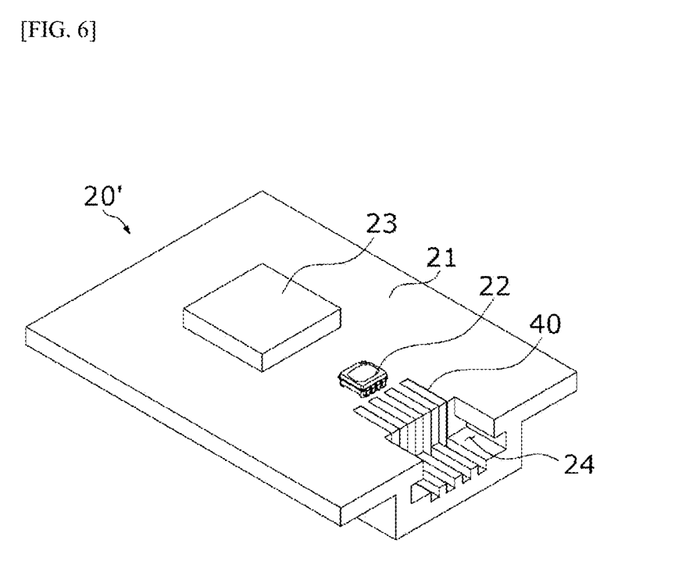
FIG. 6 is a schematic perspective view illustrating a lighting controller according to another embodiment.

FIGS. 5 and 6 schematically show an LED block 10' and a lighting controller 20' according to another embodiment.

Referring to the drawings, the LED block 10' may be formed as a structure in which connectors 100 are serially extend from a base 11 so that the connectors 100 and the base 11 are integrally formed. In this case, the base 11 may be provided as an LMA board.

In the embodiment, a male connector 130 may be formed to include a body 131 protruding to extend outward from one side surface of the base 11 and a pair of wings 132 which protrude outward from lower ends of two side surfaces of the body 131 to form step structures with an upper surface of the body 131. That is, the male connector 130 may be formed in a two-stage structure having an upper portion A1 having a relatively small width in a width direction perpendicular to an extension direction of the body 131 and a lower portion A2 having a relatively large width.

A female connector 140 may be formed to include a first groove 141 which is recessed inward from the other side surface of the base 11 and extends downward from the base 11 to accommodate the body 131 of another male connector 130 and second grooves 142 formed at two lower sides of the first groove 141 to accommodate the wings 132 of another male connector 130. That is, the first groove 141 and the second grooves 142 of the female connector 140 may be formed in a shape corresponding to a cross-sectional shape of the two-stage structure of the male connector 130.

Meanwhile, a plurality of connecting protrusions 133 by which a circuit pattern 40 is exposed to the outside may be provided on a lower surface of the body 131 of the male connector 130. In addition, a plurality of connecting grooves 143 by which the circuit pattern 40 is exposed to correspond to the connecting protrusions 133 may be provided to be recessed in a bottom surface of the first groove 141 of the female connector 140.

The connecting protrusions 133 and the connecting grooves 143 are formed in structures to extend to be long in a fastening direction of the male connector 130 and may be formed to be engaged with each other.

The circuit pattern 40 may be exposed to the outside through the connecting protrusions 133 and the connecting grooves 143. Accordingly, as the body 131 and the wings 132 of the male connector 130 are inserted into and fastened to the first groove 141 and the second grooves 142 of the female connector 140, the connecting protrusions 133 and the connecting grooves 143 are engaged to match with each other, and thus circuit patterns 40 at two sides are connected to each other.

Like the LED block 10', the lighting controller 20' may be formed as a structure in which a connector 24 and a frame 21 are integrally formed. In this case, the frame 21 may be provided as an LMA board.

In the present embodiment, it is illustrated that the connector 24 is formed on one side surface of the frame 21 as a female connector, but the present invention is not limited thereto. For example, a male connector may also be provided on the frame 21.

Since a specific structure of the connector 24 provided as the female connector is the same as that of the female connector 140 of the LED block 10', a description thereof will be omitted.

FIGS. 7 to 10 schematically show an LED block 10" and a lighting controller according to still another embodiment.

Figure 7A:
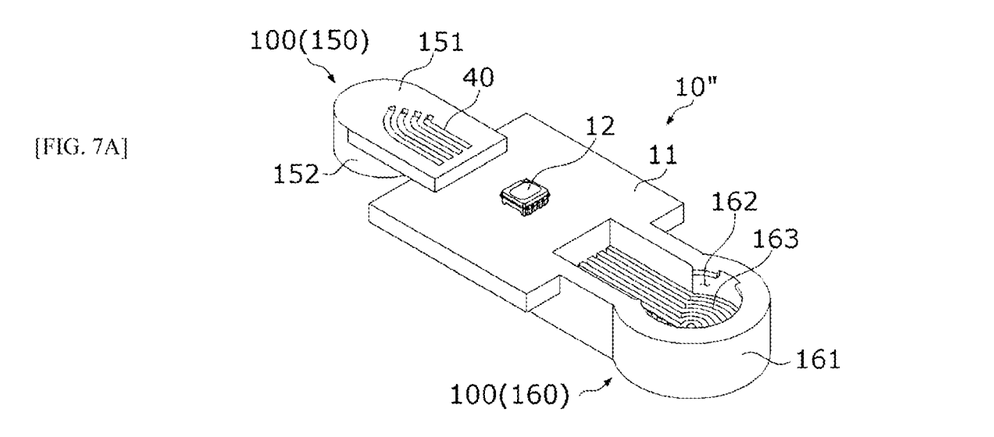
FIGS. 7A and 7B are schematic perspective and side views illustrating an LED block according to still another embodiment.
Figure 7B:
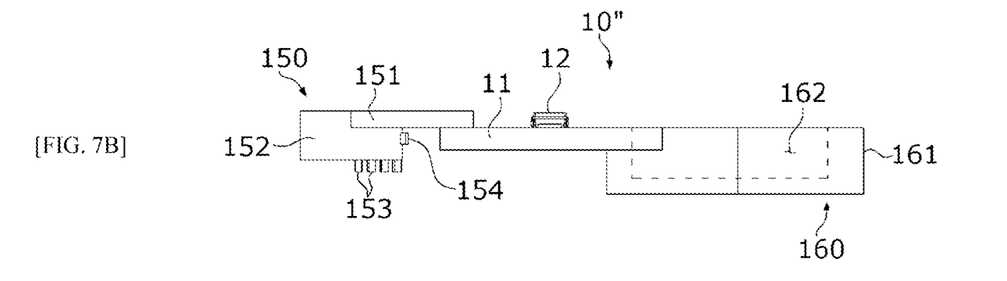

Referring to the drawings, the LED block 10" may be formed as a structure in which connectors 100 are provided to serially extend from the base 11 so that the connectors 100 and the base 11 are integrally formed. In this case, the base 11 may be provided as an LMA board.

In the embodiment, a male connector 150 may be formed to include a horizontal member 151 extending parallel to and outward from one side surface of the base 11 and a vertical member 152 extending downward from a lower portion of the horizontal member 151 toward a lower surface of the base 11.

A female connector 160 may be formed to include a housing member 161 including an accommodation groove 162 which extends parallel to and outward from the other side surface of the base 11, is open upward, and accommodates the vertical member 152 of another male connector 150.

Figure 8:
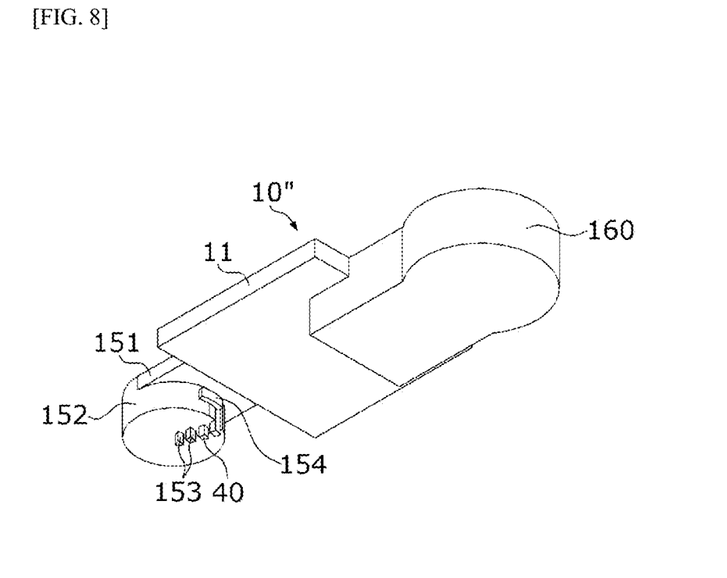
FIG. 8 is a schematic bottom view illustrating the LED block of FIG. 7A.

The vertical member 152 may have a structure in a cylindrical shape and include a plurality of connecting protrusions 153 formed to protrude from a lower surface thereof such that a circuit pattern 40 is exposed. The connecting protrusions 153 may be arranged to be spaced a predetermined interval from a center toward an outer edge of the lower surface of the vertical member 152.

Figure 9:
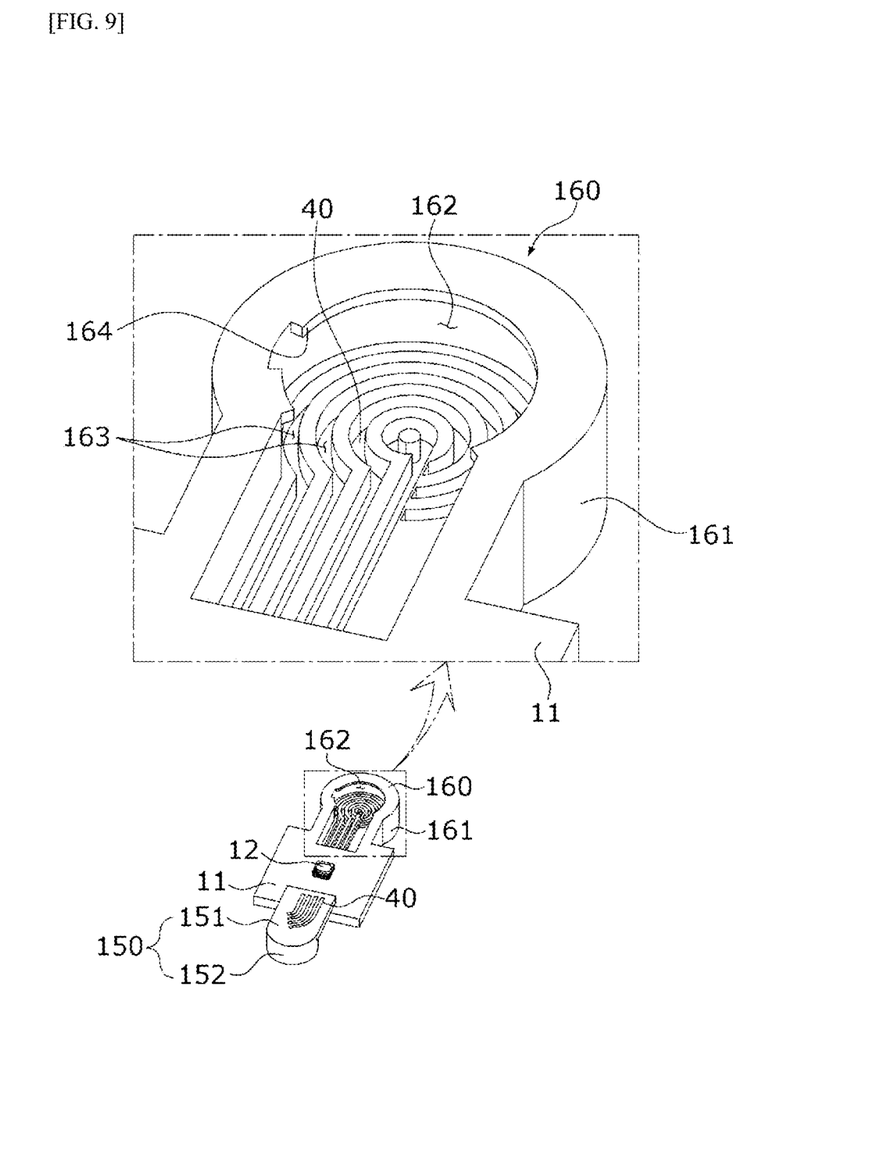
FIG. 9 is a schematic enlarged perspective view illustrating the LED block of FIG. 7A.

In addition, the accommodation groove 162 provided in an end portion of the housing member 161 may have a shape corresponding to a shape of the vertical member 152 and include a plurality of connecting grooves 163 which are formed to be recessed in a bottom surface so that the circuit pattern is exposed to correspond to the connecting protrusion 153. The connecting grooves 163 may be arranged to be spaced apart from each other to form partial circular orbits on concentric circles about a center of the accommodation groove 162.

The circuit pattern 40 may be exposed to the outside through the connecting protrusions 153 and the connecting grooves 163. Accordingly, as the vertical member 152 is inserted into and accommodated in the accommodation groove 162 from above the housing member 161, the connecting protrusions 153 and the connecting grooves 163 are engaged to match with each other, and thus circuit patterns at two sides are connected to each other.

In addition, even when the vertical member 152 rotates in a state of being accommodated in the accommodation groove 162, since the connecting protrusions 153 moves along the orbits formed along the accommodation grooves 162, the circuit patterns 40 at both sides maintain the contact state.

Meanwhile, the vertical member 152 may include a protrusion 154 formed on an outer circumferential surface, and the housing member 161 may include a flange 164 protruding from an upper portion of the accommodation groove 162 toward an inner side of the accommodation groove 162. Accordingly, in a state in which the vertical member 152 is accommodated in the accommodation groove 162, upward movement of the protrusion 154 is blocked by the flange 164, and thus the vertical member 152 is formed not to be easily separated from the accommodation groove 162.

Figure 10:
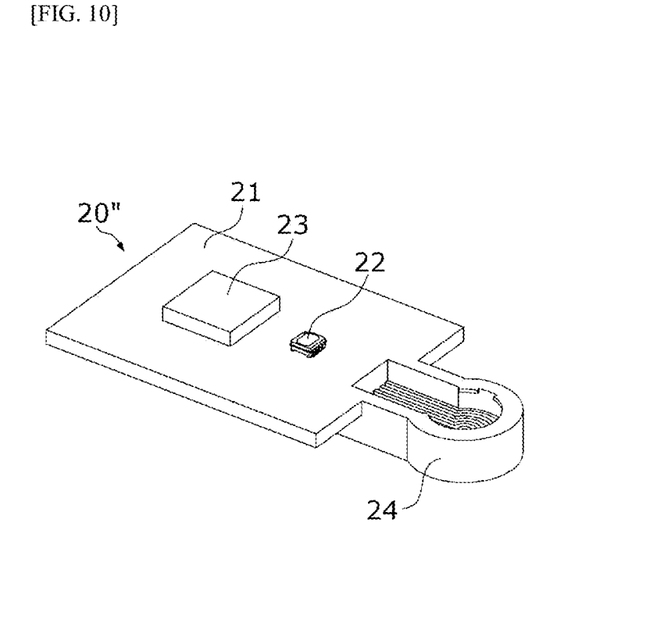
FIG. 10 is a schematic perspective view illustrating a lighting controller according to still another embodiment.

Like the LED block 10", the lighting controller 20" may also be formed as a structure in which a connector 24 and a frame 21 are integrally formed. In this case, the frame 21 may be provided as an LMA board.

In the present embodiment, it is illustrated that the connector 24 is provided in one side surface of the frame 21 as a female connector, but the present invention is not limited thereto. For example, a male connector may also be provided on the frame 21.

Since a specific structure of the connector 24 provided as the female connector is the same as that of female connector 160 of the LED block 10", a description thereof will be omitted.

Figure 11:
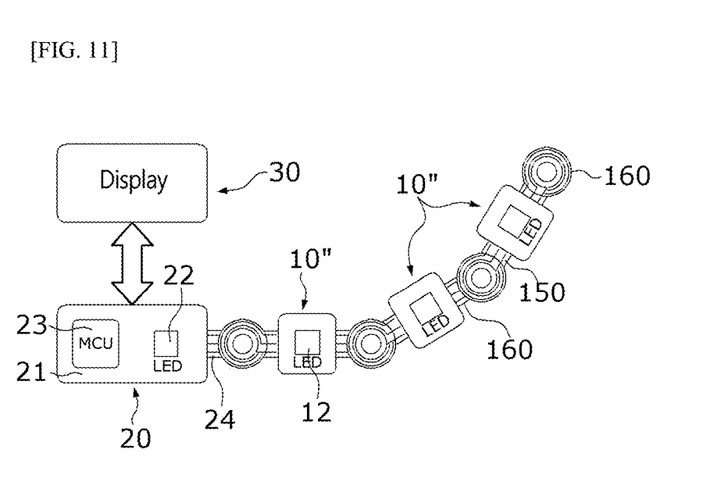
FIG. 11 is a schematic block diagram illustrating a lighting device according to another embodiment.

Referring to FIG. 11, a plurality of LED blocks 10''' connected to each other through the structure of the vertical member 152 and the housing member 161 described above can rotate in various directions to implement lighting in curved type structures. Particularly, since the plurality of LED blocks 10" can be freely deformed and installed in a linear or curved type according to an installation structure in a vehicle, there is an advantage of improving a degree of installation freedom.

Figure 12:
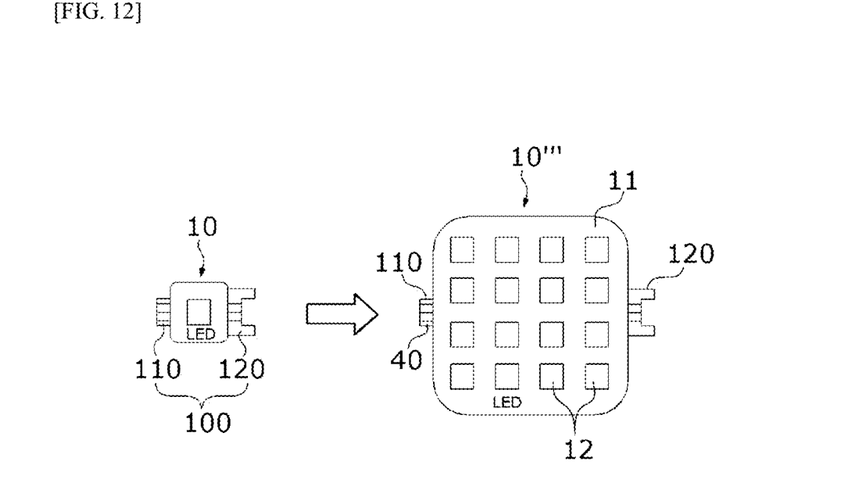
FIG. 12 is a schematic block diagram illustrating an LED device according to yet another embodiment.

FIG. 12 shows an LED block 10' according to yet another embodiment.

Referring to the drawing, the LED block 10''' may include a base 11 including a circuit pattern 40, and a plurality of LEDs 12 may be mounted on an upper surface of the base 11 and connected to the circuit pattern 40.

The plurality of LEDs 12 may be disposed to be spaced a predetermined interval from each other in a form of rows and columns. That is, unlike a case in which a single LED 12 is provided, and each LED block 10 implements point lighting, in the present embodiment, the LED block 10''' includes the plurality of LEDs 12 to implement surface lighting.

Accordingly, by connecting the LED block 10 implementing the point lighting and the LED block 10''' implementing the surface lighting, a design for implementing more dynamic lighting can be performed.

Connectors 100 may include a male connector 110 provided on one side surface of the base 11 and a female connector 120 provided in the other side surface of the base 11 and may be connected to the plurality of LEDs 12 through the circuit pattern 40.

As described above, according to the embodiment of the present invention, by variously prefabricating the LED blocks 10 on which the LEDs 12 are mounted according to specifications, selectively connecting and assembling the LED blocks 10 satisfying requirements according to concepts as needed to completely form a lighting device 1, and verifying the lighting device 1, the conventional PCB design process performed when a mockup is manufactured can be omitted, a new design and manufacturing according to changes in the number of LEDs and specifications are not required, and thus losses of time and cost can be prevented during a concept verification process.

In addition, since the lighting device 1 is completely formed such that the LED blocks 10 are simply connected and assembled, the lighting device 1 can be easily changed to correspond to any structure at a position at which the lighting device is installed, and thus there is an advantage of improving a degree of installation freedom.

According to embodiments of the present invention, a prefab lighting device, in which an efficiency of product unit verification for a lighting concept designed by an initial developer is improved and a degree of installation freedom is improved due to a changeable form corresponding to any structure at an installation position in a vehicle, can be provided.

The effects of the present invention are not limited to the above-mentioned effects, and other effects which are not mentioned above will be clearly understood by those skilled in the art through the appended claims.

While the present invention has been described above with reference to exemplary embodiments, it may be understood by those skilled in the art that various modifications and changes of the present invention may be made within a range not departing from the spirit and scope of the present invention defined by the appended claims. In addition, it should be interpreted that differences related to modifications and changes fall within the scope of the present invention defined by the appended claims.

What is claimed is:

1. A prefab lighting device, which is installed in an interior of a vehicle and implements indoor lighting, the prefab lighting device comprising:
   a light-emitting diode (LED) block provided with an LED installed thereon and a connector formed on each of one side surface and the other side surface thereof and electrically connected to the LED;
   a lighting controller detachably connected to the LED block through the connector to control operation of the LED block; and
   an input unit connected to the lighting controller to input settings for the operation of the LED block,
   wherein the LED block is provided as a plurality of LED blocks detachably connected to each other through the connectors,
   wherein the LED block includes a base including a circuit pattern, the LED is mounted on an upper surface of the base and connected to the circuit pattern, and
   the connectors include a male connector provided on one side surface of the base and a female connector provided in the other side surface of the base and are connected to the LED through the circuit pattern,
   the male connector includes a body protruding outward from the one side surface of the base and wings protruding outward from lower ends of two side surfaces of the body to form a step structure with an upper surface of the body; and
   the female connector includes a first groove recessed inward from the other side surface of the base to accommodate a body of another male connector and second grooves formed at two sides of a lower portion of the first groove to accommodate wings of the another male connector.

2. The prefab lighting device of claim 1, wherein:
   the male connector includes guide protrusions protruding outward from two side surfaces;
   the female connector includes guide grooves for accommodating the guide protrusions in two side surfaces; and
   the guide grooves are extended and formed to be long in a fastening direction of the male connector.

3. The prefab lighting device of claim 2, wherein the guide grooves include hook protrusions that are formed on an end portion to prevent separation of the guide protrusions.

4. The prefab lighting device of claim 1, wherein:
   a plurality of connecting protrusions by which the circuit pattern is exposed are formed on a lower surface of the body; and
   a plurality of connecting grooves by which the circuit pattern is exposed are formed to be recessed in a bottom surface of the first groove in correspondence to the connecting protrusions.

5. A prefab lighting device, which is installed in an interior of a vehicle and implements indoor lighting, the prefab lighting device comprising:
   a light-emitting diode (LED) block provided with an LED installed thereon and a connector formed on each of one side surface and the other side surface thereof and electrically connected to the LED;

a lighting controller detachably connected to the LED block through the connector to control operation of the LED block; and an input unit connected to the lighting controller to input settings for the operation of the LED block, wherein the LED block is provided as a plurality of LED blocks detachably connected to each other through the connectors, wherein the LED block includes a base including a circuit pattern, the LED is mounted on an upper surface of the base and connected to the circuit pattern, and the connectors include a male connector provided on one side surface of the base and a female connector provided in the other side surface of the base and are connected to the LED through the circuit pattern, the male connector includes a horizontal member extending parallel to and outward from the one side surface of the base and a vertical member extending downward from an end portion of the horizontal member toward a lower surface of the base; and the female connector includes a housing member including an accommodation groove which extends parallel to and outward from the other side surface of the base, is open upward, and accommodates another vertical member of another male connector.

6. The prefab lighting device of claim 5, wherein:
the vertical member has a structure having a cylindrical shape and includes a plurality of connecting protrusions which protrude from a lower surface of the vertical member so that the circuit pattern is exposed; and
the accommodation groove provided in an end portion of the housing member has a shape corresponding to a shape of the vertical member and includes a plurality of connecting grooves which are formed to be recessed in a bottom surface of the accommodation groove so that the circuit pattern is exposed to correspond to the plurality of connecting protrusions.

7. The prefab lighting device of claim 6, wherein:
the plurality of connecting protrusions are arranged to be spaced a predetermined distance from a center toward an outer edge of the lower surface of the vertical member; and
the plurality of connecting grooves are arranged to be spaced apart from each other to form partial circular orbits on concentric circles about a center of the accommodation groove.

8. The prefab lighting device of claim 6, wherein:
the vertical member includes a protrusion on an outer circumferential surface of the vertical member;
the housing member includes a flange protruding from an upper portion of the accommodation groove toward an inner side of the accommodation groove; and
in a state in which the another vertical member is accommodated in the accommodation groove, upward movement of the protrusion is blocked by the flange.

9. The prefab lighting device of claim 1, wherein:
the lighting controller includes a frame including the circuit pattern and a micro controller unit (MCU) mounted on the frame and connected to the circuit pattern; and
one of the male connector and the female connector is provided on one side surface of the frame and connected to the MCU through the circuit pattern.

10. The prefab lighting device of claim 9, wherein:
the LED is further mounted on an upper surface of the frame; and
the LED is connected to the MCU through the circuit pattern.

11. The prefab lighting device of claim 1, wherein the input unit includes a touch type display.

12. The prefab lighting device of claim 5, wherein:
the male connector includes guide protrusions protruding outward from two side surfaces;
the female connector includes guide grooves for accommodating the guide protrusions in two side surfaces; and
the guide grooves are extended and formed to be long in a fastening direction of the male connector.

13. The prefab lighting device of claim 12, wherein the guide grooves include hook protrusions that are formed on an end portion to prevent separation of the guide protrusions.

14. The prefab lighting device of claim 5, wherein:
the lighting controller includes a frame including the circuit pattern and a micro controller unit (MCU) mounted on the frame and connected to the circuit pattern; and
one of the male connector and the female connector is provided on one side surface of the frame and connected to the MCU through the circuit pattern.

15. The prefab lighting device of claim 5, wherein the input unit includes a touch type display.

* * * * *